(12) United States Patent
Elliott (10) Patent No.: US 9,098,596 B2
(45) Date of Patent: Aug. 4, 2015

(54) REDIRECTING WEB CONTENT (75) Inventor: Isaac Elliott, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 319 days.

(21) Appl. No.: 13/443,195

(22) Filed: Apr. 10, 2012

(65) Prior Publication Data

US 2013/0268691 A1 Oct. 10, 2013

(51) Int. Cl.
*G06F 15/173* (2006.01)
*G06F 17/30* (2006.01)

(52) U.S. Cl.
CPC ................ *G06F 17/30902* (2013.01)

(58) Field of Classification Search
USPC .................................. 709/238, 239
See application file for complete search history.

(56) References Cited

U.S. PATENT DOCUMENTS

| | | | |
|---|---|---|---|
| 2003/0126276 A1* | 7/2003 | Kime et al. | 709/231 |
| 2005/0259623 A1* | 11/2005 | Garudadri et al. | 370/335 |
| 2006/0018562 A1* | 1/2006 | Ruggiero | 382/300 |
| 2006/0080453 A1* | 4/2006 | Thukral | 709/231 |
| 2008/0066139 A1* | 3/2008 | Tsai | 725/139 |
| 2009/0158370 A1* | 6/2009 | Li et al. | 725/110 |

* cited by examiner

*Primary Examiner* — David X Yi
*Assistant Examiner* — Hermon Asres
(74) *Attorney, Agent, or Firm* — Great Lakes Intellectual Property, PLLC (57) ABSTRACT

Continued access to services, content, and other electronically-based signaling is contemplated. The continued access may be facilitated with a redirect server or other device having capabilities sufficient to facilitate redirecting content when the user desires to transition access from a first device to a second device, such as but not limited to facilitating redirection of a television program streamed to a tablet so that the to the television program can be viewed through a television without disrupting or overburdening a sourcing entity originating the television program.

17 Claims, 4 Drawing Sheets

REDIRECTING WEB CONTENT

TECHNICAL FIELD

The present invention relates to redirecting content, such as but not limited to facilitating redirection of web content transmitted from a website.

BACKGROUND

Virtually any type of electronically-transmissible content is available over the Internet for download, streaming, or other transmission. This content is generally referred to as web content since access to it requires some communication over the World Wide Web, i.e., the Internet. The web content may be accessed through a web session or other connection established between a sourcing device and a receiving device. The web session may be constructed as a temporary communication channel between the sourcing device and the receiving device, at least in that the communication channel is automatically deconstructed once access to the web content ceases. In the event the web content is a television program, for example, the web session tasked with transporting the television program may be deconstructed upon occurrence of a termination event, such as by the receiving device tuning away from the television program or being turned off or ending of the television program ends.

A new or second web session may need to be constructed in order for the sourcing device to deliver the same web content to another device. The construction of a new web session can be problematic, particularly if the sourcing device is already sourcing the desired web content, since the additional session adds additional burdens on the sourcing device.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
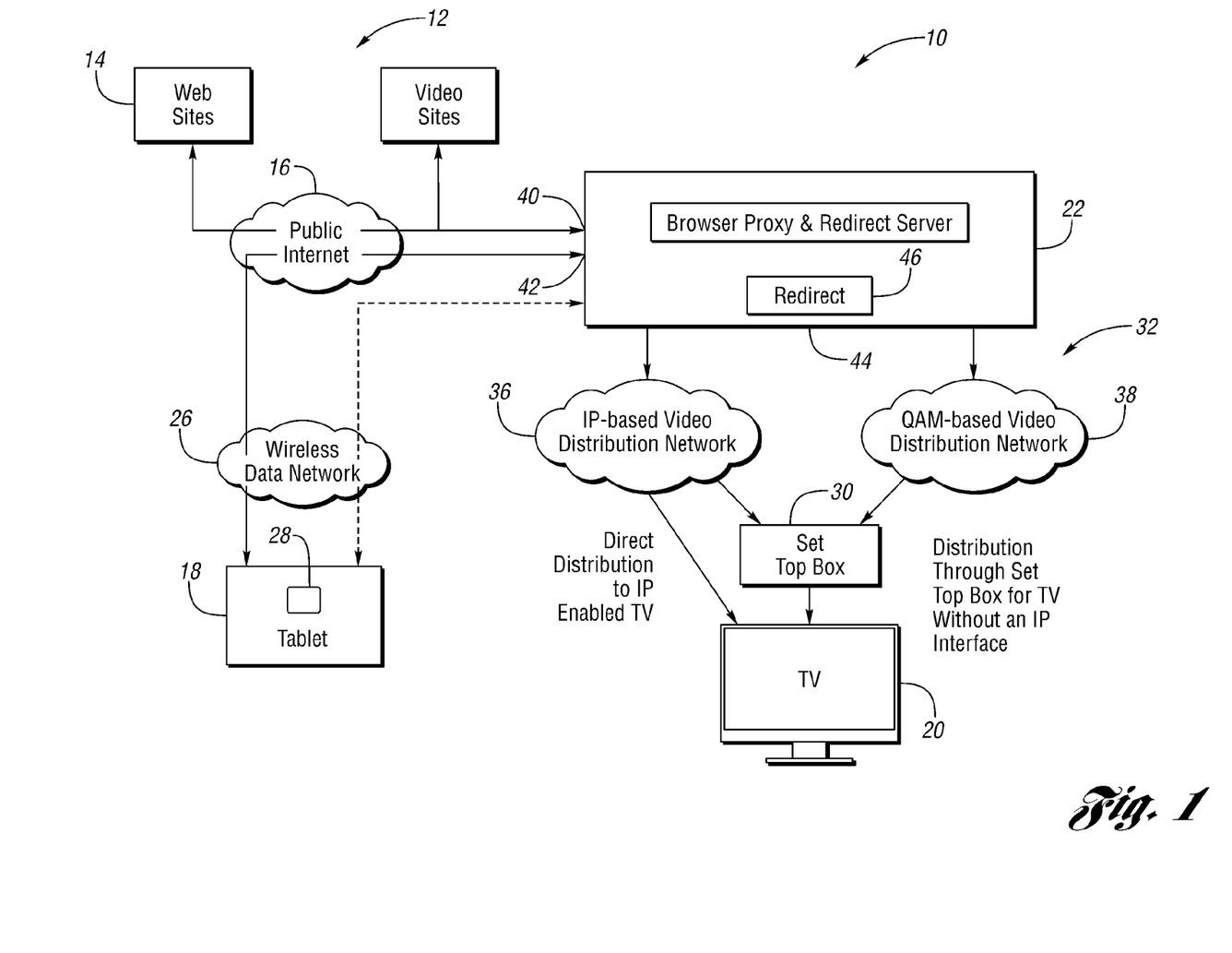
FIG. 1 illustrates a system configured to facilitate redirecting content as contemplated by one non-limiting aspect of the present invention.

FIG. 1 illustrates a system 10 configured for redirecting content as contemplated by one non-limiting aspect of the present invention. The system 10 is predominately described with respect to redirecting content sourced from one of a plurality of web servers 12, referred to interchangeably herein as web content. The content may be sourced as part of a web session, peer-to-peer connection, or other transmission channel/medium. The content is referred to as being sourced from the web servers 12 in order to demonstrate one advantageous capability of the present invention to facilitate redirecting some or all of the web content without requiring a sourcing one 14 of the web servers to additionally burden its current operation to accommodate redirecting the content. The present invention believes this capability to be advantageous in allowing web servers 12 to source content to multiple receiving devices without having to construct duplicate web sessions or otherwise facilitate additional communications for the redirected content.

The present invention is not, however, necessarily limited to redirecting web content or content sourced through web sessions. The present invention fully contemplates redirecting any type of electronically transmissible content, regardless of whether the content is sourced from a web server 12 or some other entity or device. The present invention is believed to be particularly advantageous in redirecting video transmission from web servers 12 where part of the communication takes place over the Internet 16 prior to being received at one or more user devices 18, 20. The transmission of video over the Internet or other IP-based infrastructure can require a web session to be constructed between the sourcing entity 14 and the receiving entity (e.g. one of the user devices 16, 18) for a relatively long period of time, at least in comparison to a data file download or other transmission having a shorter time period. The longer duration of the web session places a correspondingly longer burden on the sourcing entity 14, particularly if, without at least one of the advantages of the present invention, the sourcing entity 14 were tasked with supporting multiple web sessions.

The present invention contemplates alleviating the burdens on a sourcing entity 14 when it becomes desirable to redirect the content to another user device with the use of a redirect server 22, which may be configured as a browser proxy or other suitable device. The redirect server 22 may be configured to establish a first web session with the sourcing web server 14 and a second web session with a tablet 18 or other user device having capabilities sufficient to output the web content. The tablet 18 is shown to be streaming the content through the web session taking place over a local/home wireless network 26 and the Internet 16. The redirect server 22 may be configured to mimic a direct connection between the sourcing server 14 and the tablet 18 such that the first web server 14 is unaware that the second web session is actually being used to communicate the web content to the tablet 18. The redirect server may be configured to manipulate IP addresses or other messaging constructs necessary to implement the contemplated redirecting operations. The redirect server 22 may be responsible for facilitating communications between the publically available Internet 16 and the private home or service provider network 26. The redirect server 22 may include capabilities to facilitate network address translations and other operations attendant to facilitating communications between private or outside networks and private or inside network.

The redirect server 22 may be configured to maintain connections between the sourcing server 14 and the tablet 18 while the first and second web sessions are active, such as to facilitate continuous streaming of a video program or other transmissions where continuous contact may otherwise be required between two devices 16, 18 for a prolonged period of time, e.g., a period of time sufficient for a half-hour television program or a full-length movie or where some other continuous communication is required. The sourcing server 14 may require continuous receipt of acknowledgment messages or other messages indicating continued activity of the first web session or that the web content is continuing to be accessed through the tablet 18. Since the sourcing server 14 is not directly connected to the tablet 18, the redirect server 22 may be configured to mimic the responses desired by the sourcing server 14 to continue providing the web content. This may include the redirect server 22 being configured to periodically generate its own acknowledgment messages in order to prevent the sourcing server 14 from tearing down the first web session or otherwise ceasing to transmit the web content.

The redirect server 22 may be figured to periodically transmit the acknowledgment messages as a function of corresponding messages received from the tablet 18. This may require there redirect server 22 to be configured to facilitate maintaining message communication simultaneously over each of the first web session and the second web session. In addition to facilitating communication of the acknowledgment messages or other messages required to maintain construction of the first and/or second web sessions, the redirect server 22 may also be configured to adjust a bit rate, content buffering, caching, or other operations associated with facilitating a continuous transmission of the web content to the tablet 18. This may include the redirect server 22 communicating with the sourcing server 14 to assess or request a first bit rate at which data is transmitted from the sourcing server 14 to the redirect server 22 and to separately assessed or determine a second bit rate at which the data is then transmitted from the redirect server 22 to the tablet 18. The redirect server 22 may be configured to facilitate the first and second bit rates being equal and/or adjusting one of the bit rates depending upon network congestion or other factors that may influence the rate at which data must be communicated to the tablet 18 in order to ensure the desired access to the web content, i.e., so that the data is transmitted at a bit rate sufficient to provide a clear viewing of the television program.

While the tablet 18 is watching a television program streamed through the second web session, for example, the user thereof may desire to continue viewing the television program at another location or through another device, such as with through the television 20. The present invention contemplates facilitating this activity by configuring the redirect server 22 to redirect the television program for viewing at the television 20. The redirect may optionally be transparent to the sourcing entity 14 such that the sourcing entity 14 is unaware of the television program being viewed at the television 20. The redirect server 22 may be configured to receive instructions from an application 28 operating on the tablet 18 or through some other user input to begin redirecting of the web content to the television 20. The web content may be redirected to the television 20 or other device identified within instructions received from the application 28 with creation of a third web session.

The redirect server 22 may perform an interception operation where it intercepts or otherwise captures the web content being transmitted as part of the first web session. This interception may include taking or copying of some or all of the web content as it is being transmitted to the tablet 18. One non-limiting aspect of the present invention contemplates intercepting the web content without notifying the web server 14 of the interception. This may occur, for example, by the web server 14 continuing to address communications to the address associated with the redirect server 22 and the redirect server 22 continuing to address the second web session to the tablet 18 while simultaneously addressing a copy of the content for communication to the television 20 through the third web session. Because the television 20 may have limitations or not otherwise be configured to facilitate the communications associated the tablet 18, the redirect server 22 may be configured to supplement any operations necessary to ensure output of the television program at the television 20.

The television 20 is shown to be associated with a set top box 30. The set top box 30 may be associated with a cable television provider, a satellite television provider, an optical television provider or a broadcast entity where the set-top box 30 is particularly configured to process signals received over a corresponding network 32 for output to the television 20. The set-top box 30 is shown for exemplary non-limiting purposes as the present invention fully contemplates use of any other device or the elimination of the set-top box 30. The redirect server 22 is shown to include capabilities for facilitate distribution of the web content to the television 18 over one or both of an IP-based video distribution network 36 and a QAM-based video distribution network 38. The IP-based video distribution network 36 may rely upon packet transmission of the video to the set-top box 30 in/or the television 20. The QAM-based video distribution network 38 may rely upon quadrature amplitude modulation of the video for transfer to the set-top box 30, e.g., over a particular television channel or radio channel. The exemplary configuration of FIG. 1 is merely illustrative of one environment where video transmissions may occur and is not necessarily intended to limit the scope in contemplation the present invention.

Once the redirect 22 server redirects the television program to the television 20, the television 20 can begin showing the television according to its normal operation. The redirection of the television program can take place of or in addition to a corresponding showing of the television program at the tablet 18. In particular, the present invention contemplates a scenario where the second web session is maintained while the redirect server 22 is redirecting at least a portion of television program to the television 20 through the third web session. The continuance of the second session may allow the tablet 18 to support interactive control or communication of user inputs separately from the television 20, and optionally without displaying the content showing within the television 20. Rather than relying on the tablet 18 to facilitate up-keep or maintenance of the third web session, the redirect server 22 may become responsible for performing the operations previously performed by the tablet 18 in establishing and maintaining the second web session. In this manner, the redirection of the web content may take place without having to continue delivery of the web content and/or signals associated with maintaining the second web session to the tablet 18.

The ability of the present invention to facilitate redirecting the television program from the tablet 18 to the television 20 may be advantageous when the user accessing the television program on the tablet 18 is operating in a mobile environment and reaches their home or other environment having the television 20, such as if the television 20 provides a better viewing experience in the tablet. The present invention particular contemplates the tablet 18 having less output sophistication than the television 20 such that the redirect server 22 may perform some conversion or other processing of the television program in order to take advantage of the enhanced capabilities of the television 20, e.g., changing an aspect ratio of the television program, increasing a definition of the television program (up converting from a standard definition (SD) to a high definition (HD), and/or performing other operations related to a difference in processing capabilities of the tablet 18 and the television 20, such as converting codecs used to support transmission of the television program.

The redirect server 22 may be configured to facilitate redirecting web content in a manner that is transparent to the sourcing entity 14. It is believed that this capability may ameliorate the processing demands on the sourcing entity 14, and in particular, eliminate the need of the sourcing entity 14 to establish a new web session with the television 20 or other redirected-to device. The configuration of the redirect server 22 may further ameliorate the processing demands of the web server 14 in that it may assume the conversion and other processing required to facilitate output of the web content at the television 20. For example, the web server 14 may be configured to facilitate output of the web content in a manner sufficient for viewing on an IP-type of device like the tablet 18 but insufficient or inadequate for viewing on the television 20. Rather than requiring the web server 14 to support television viewing capabilities in order to reach a television audience or the proprietary communication requirements of a television transmission infrastructure 32, the redirect server 22 may be relied upon by the web server 14 to make up for any deficiencies in its capabilities and/or to eliminate the burden of having to support multiple output platforms.

The redirect server 22 may also be configured to facilitate redirecting web content according to an adaptive bit rate strategy. The adaptive bit rate strategy may be used to adjust a bit rate or other communication requirements of the second and third web sessions depending on network congestion or other transmission medium dependent characteristics of the transmission mediums associated therewith. For example, the redirect server 22 may expect more transmission delays over the public network 16 associated with the tablet 18 than the private network 32 associated with the set-top box 30 such that the redirect server 22 may buffer more web content prior to beginning transmission over the second web session then that which would be needed to facilitate communications over the third web session. The redirect server 22 may also be configured to adjust the bit rate of the second web session to be less than the third web session in order to further compensate for the expected congestion of the public network 16. The ability to adaptively adjust communications associated with the second and third web sessions may be particularly beneficial to ensuring that web content displayed through the tablet 18 is synchronized with the web content displayed through the television 20, i.e., that frames of the television program are showing at the same time within both of the tablet 18 and the television 20.

The ability of the redirect server 22 to facilitate adaptive bit rates or to otherwise synchronize the second and third web sessions may be particularly beneficial in ameliorating processing demands on the sourcing server 14. The sourcing server 14 may be required to operate at a slower or fixed bit rate relative to that of the second and third web sessions and/or it may lack capabilities sufficient to assess network congestion or other transmission delays that would otherwise be associated with each of the tablet 18 and television 20, particularly delays associated with the private or proprietary network 32 of the television 20 which may not be accessible to the sourcing server 14. The sourcing server 14 may rely upon the redirect server 22 to account for network congestion and other limitations associated with the mediums of the second and third web sessions. This capability of the present invention, therefore, allows the sourcing server 14 to maintain a single connection (first web session) with the redirect server 22 while effectively servicing multiple user devices (the tablet 18 and the television 20) without the processing demands which would otherwise be required to effectively service multiple user devices, i.e., those associated with separately supporting the second web session and the third web session.

It is contemplated that the redirect server 22 may facilitate the simultaneous transmission or independent transmission of either one or both of the second and third web sessions in a dynamic manner. The dynamic manner may be characterized by the redirect server processing web content received in real-time, such as that associated with a real-time television program, and then buffering the content for transmission over one or both of the second and third web sessions. The redirect server may be configured to conduct the second and third web sessions without having to store or manipulate the web content ahead of time, other than the temporary buffering needed to facilitate the second and third web sessions. The ability to adjust the bit rates associated with the second and third sessions may also be beneficial and facilitating tablet originating controls of content output through the television 20. With respect to a television program having a plurality of frames, this may include the capability to synchronize bit rates such that the same frame shows at each of the tablet 18 and the television 20 at the same time in response to related playback controls implemented through the tablet 18. The tablet 18 may be used to issue control signals to the redirect server 22 and/or the sourcing server 14 to facilitate pausing, rewinding, fast forwarding, stopping, and other playback related controls. These controls may be synchronized with the adaptive bit rate so that when playback or other frame changes occur simultaneously.

The redirect server 22 may be configured with a first interface 40, a second interface 42, and a third interface 44 to respectively support the first web session, the second web session, and the third web. The redirect server 22 may include a redirect 46 or other element configured to facilitate intercepting or otherwise copying the content originating from the sourcing server 14 for the noted transmission to one or both of the tablet 18 and television 20. The redirect 46 may include a bit rate adapter (not shown) to facilitate the contemplated control signaling relative to the first, second, third web sessions. While the redirect server 22 is noted to include these components, the present invention fully contemplates the redirect server 22 being configured with other capabilities sufficient to facilitate the continued access to content in the manner contemplated by the present invention. The redirect server 22, for example, may include a browser or other web-based agents having capabilities sufficient to facilitate establishing web sessions with the sourcing websites 14 or servers. The browser may be configured to facilitate accomplishing the noted redirecting operations in order to maintain continuous access to the content without having to deconstruct the first web session, and optionally, without having to deconstruct the second web session. This ability to maintain the constructed web sessions may be helpful, particularly with respect to the sourcing server 14, in ameliorating processing demands associated with continuously constructing and deconstructing web sessions.

Figure 2:
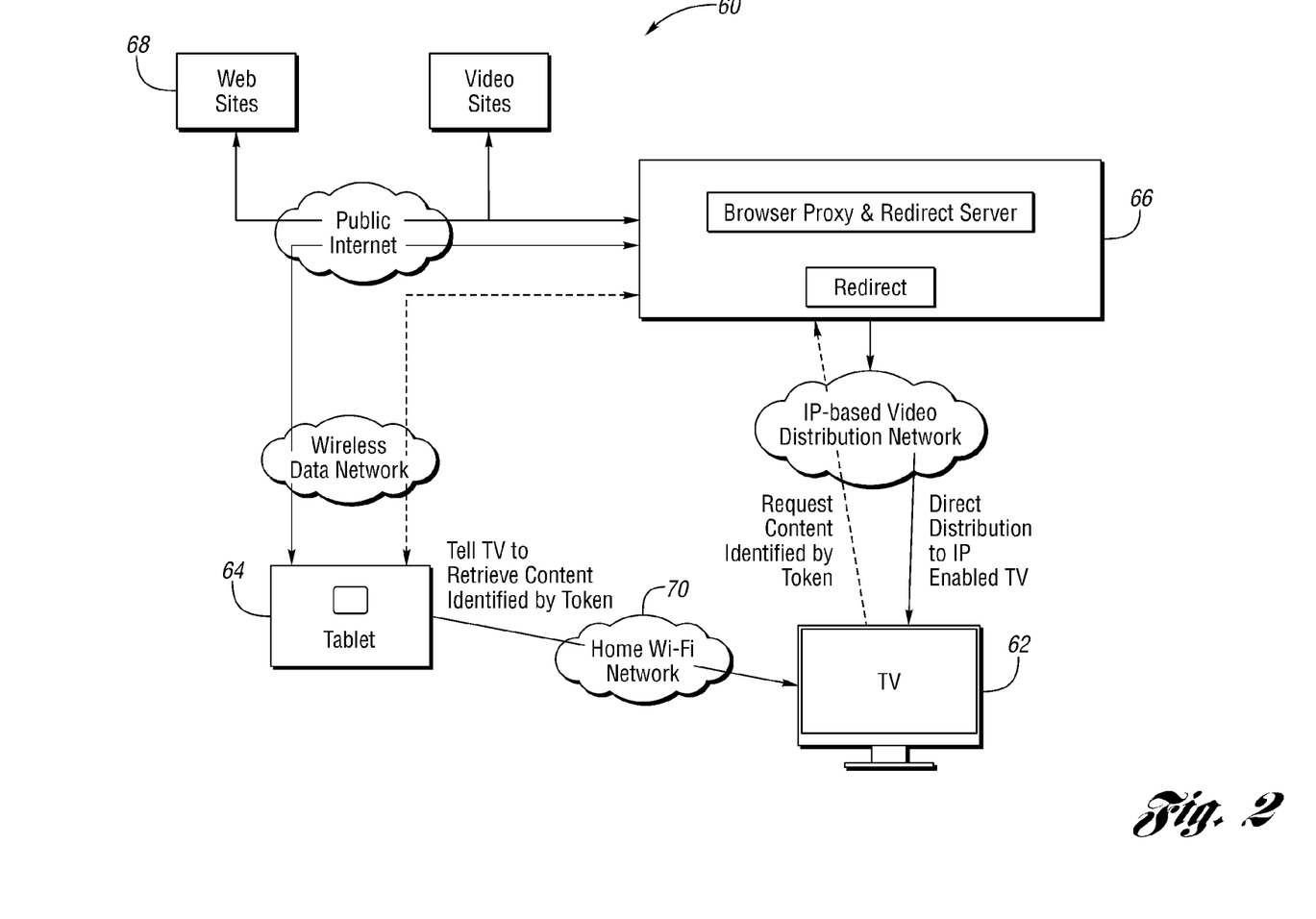
FIG. 2 illustrates a system configured to facilitate redirecting content as contemplated by one non-limiting aspect of the present invention.

FIG. 2 illustrates a system 60 configured to facilitate redirecting web content as contemplated by one non-limiting aspect of the present invention. The content can be redirected to an IP-enabled alternative display, such as an IP-enabled TV 62. In this variant, the original device (for example, a tablet 64) can first request a token for the current web session from a redirect server 66. This token may be configured to uniquely identify a second web session that is currently in progress between the redirect server 66 and the tablet 64 based on a first web session between a sourcing server 68 and the redirect server 66. The tablet 64 can then send a command directly to the IP-enabled TV 62 via a home network 70, such as a Wi-Fi network, requesting the content identified by the given token. The TV 62 can then send a request to the redirect server 66, asking for the content identified by the token, and the redirect server 66 would then deliver the content directly to the requesting TV through a third web session.

The configuration shown in FIG. 2 may ameliorate processing demands on the tablet 64 in that the tablet 64 may not need to communicate with the redirect server 66 in order to facilitate redirecting the web content to the television 62. This may also be advantageous in that it allows the device 62 requesting the redirect to identify itself to the redirect server 66, thereby, eliminating the need of the tablet 64 to input an address for the television or otherwise identify a destination for the redirected web content. The passing of the token to the television may cease further transmission of the web content and/or the web session to the tablet 64 and/or the token may be copied or shared such that the session may continue with the tablet 64. In particular, the present invention contemplates continued use of the tablet 64 to facilitate control and or operation of the television 62 with respect to the web content, such as by allowing the user to perform interactive capabilities through the tablet 64 while simultaneously viewing web content to the television 62, particularly if television 62 has sufficient capabilities to support two-way you appreciated to facilitate such activity.

Figure 3:
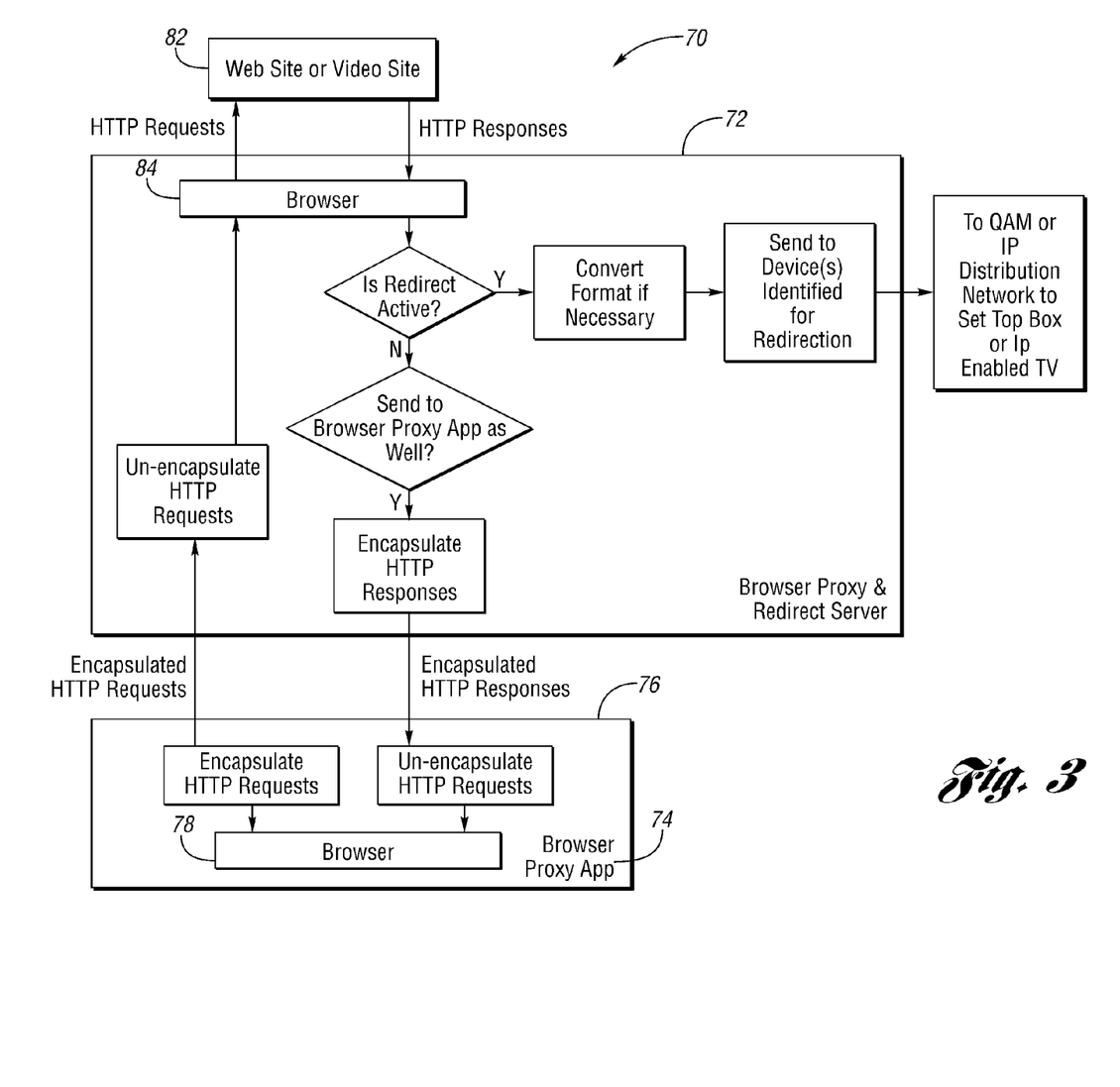
FIG. 3 illustrates a system configured to facilitate redirecting content as contemplated by one non-limiting aspect of the present invention.

FIG. 3 illustrates a system 70 configured to facilitate redirecting web content as contemplated by one non-limiting aspect of the present invention. The system 70 illustrates a redirect server 72 cooperation with a proxy application 74 operating on a mobile device 76 to facilitate redirecting web content. The proxy application 74 may be configured to support operations associated with a web browser 78. The web browser 78 may be configured to facilitate access to the Internet or webpages through the use of HTTP requests and related transmission. As shown, the browser 78 may be configured to encapsulate HTTP requests for communication to the redirect server 72. The redirect server 72 may un-encapsulate the HTTP request and to generate a second HTTP request to a website or video site 82 from which the web content is to be received. And HTTP response of the responsive the web server 82 to the second HTTP request may be initially processed with the redirect server 72. The redirect server 72 may assess whether a redirect is active. If the redirect is inactive, the redirect server 72 may decapsulate response for transmission to the proxy application 74, optionally with a re-encapsulating prior to communication to the mobile device 76, i.e., prior to being communicated to the browser 78 for display.

If the redirect is active, the redirect server 72 may perform a redirect operation where a copy or the entire web content is redirected to a set top box or a device other than the mobile device 72. The redirect operation may include format conversion or other processing necessary to facilitate delivery of the web content to the set top box. The device intended to receive the redirected web content may be identified within messages received from the mobile device 76 having the browser application. Optionally, if the browser proxy application 74 is operating on a device with an open browser environment, a browser 84 of the redirect server 72 could interact with one or more native browsers directly, instead of replicating the browser environment within the browser proxy application of the redirect server 72 (in closed environments it may be necessary to replicate the browser within the browser proxy application).

Figure 4:
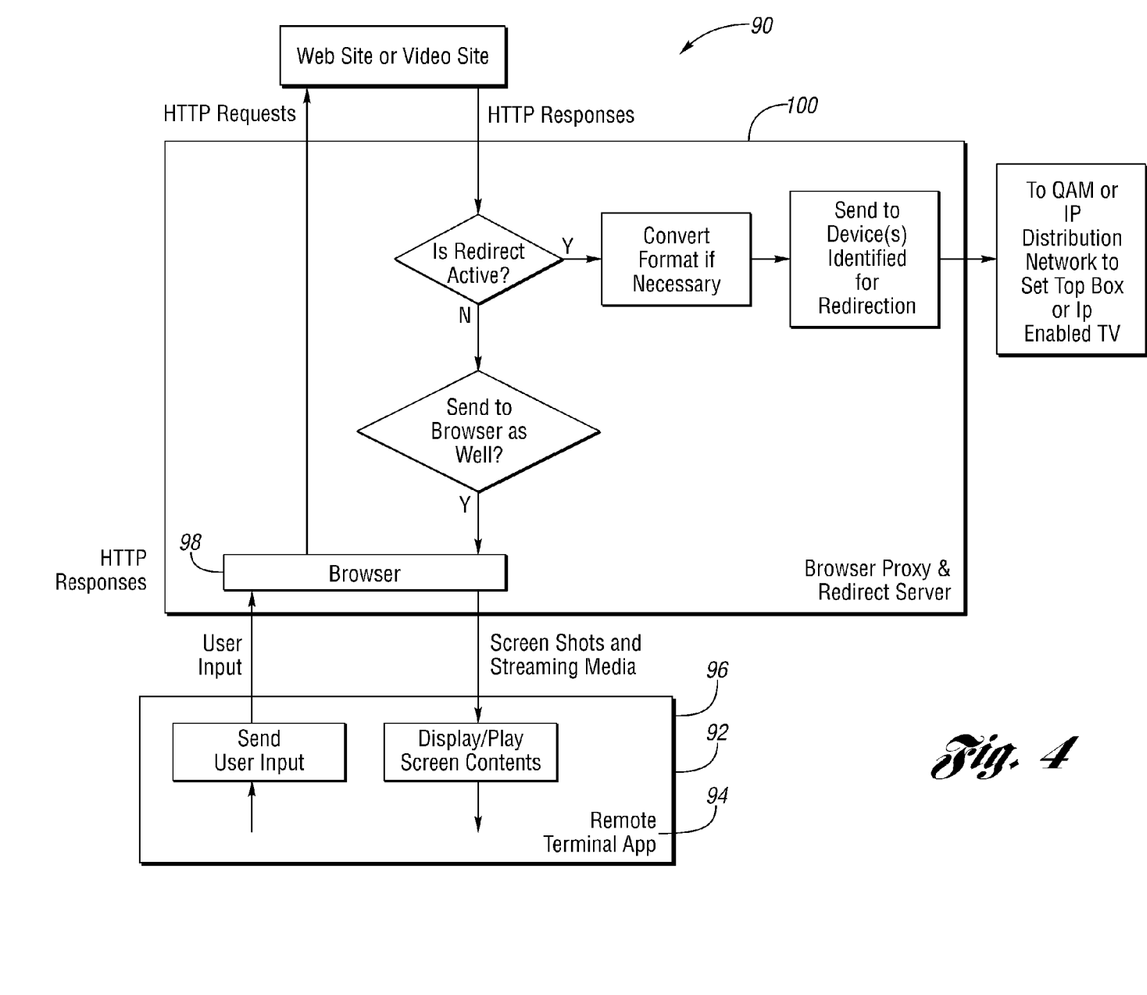
FIG. 4 illustrates a system configured to facilitate redirecting content as contemplated by one non-limiting aspect of the present invention.

FIG. 4 illustrates a system 90 configured to facilitate redirecting content as contemplated by one non-limiting aspect of the present invention with the use of a remote user interface. A remote user interface 92 may be included with a remote terminal application 92 operating on a first device 96 from which the web content is to be redirected. A browser 98 may be included in a redirect server 100, optionally as part of a cloud computing environment. In this manner, the redirect server 100 need not necessarily be implemented as a separate server on the Internet. Instead, the corresponding functions could be integrated directly into web sites, in order to enable the redirect function within the web site itself. This "native implementation" of the browser proxy and redirect function has the potential advantage of working within standard browsers on any device, removing the possible requirement for a browser proxy application on the controlling device.

As supported above, there are a number of variations on how the invention can be used. In combination with a "universal device ID", what one is watching on one device can be redirected to any other device, as long as the device can be identified and "streamed to" by the network server. The same thing can happen vice versa, where content can "reverse redirect" the TV output to a mobile device. In one example, one can command TV video to be displayed on a mobile device, then leave the building, watching the same video while en route to a hotel, and then when one arrives at a room to put the video on the TV in the hotel room, assuming the Device ID of the hotel room TV can be determined. The invention can be extended to techniques for assigning and managing universal device IDs, and for techniques for commanding a device to reveal its Universal Device ID.

One non-limiting aspect of the present invention allows users of mobile devices to avoid chewing up their monthly bandwidth quota on high-bandwidth applications when another screen and network are available. The invention adds value as end users may be willing to pay a fee for the application, possibly including a recurring fee. Also, if the invention becomes widely used it can serve as a deterrent against high-speed data cord-cutting, where users elect to have only a wireless data plan and discontinue their wireline data plan. This invention reinforces the value of the wireline data plan and/or the wireline video service. The invention also adds value for content providers, who can now focus their interactive application development on web standards, and could eventually avoid developing interactive applications in a wide variety of formats for a wide variety of networks and end devices.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating continued access to web content provided from a first site to a first device after a first user of the first device desires the web content to be accessed at a second device, the web content being transmitted from the first site to a first address as part of a first web session, the method comprising:
    directing at least a first portion of the web content to the first device as part of a second web session, the second web session being separate from the first web session;
    redirecting at least a second portion of the web content to the second device as part of a third web session, the third web session being separate from the first web session;
    wherein the second portion is redirected to the second device while the second web session is still active;
    addressing the first portion to a second address assigned to the first device; and
    addressing the second portion to a third address assigned to the second device redirecting the second portion to the third address after directing the first portion to the second address and while additional portions of the web content are still being provided from the first site as part of the first web session;

redirecting the second portion to the third address without notifying the first site of the third address; and redirecting the second portion to the second device without the first site creating a fourth web session to transmit the second portion to the second device.

2. The method of claim 1 further comprising copying the second portion from the web content being transmitted as part of the first web session while the first portion is still being transmitted through the second web session to the first device.

3. The method of claim 1 wherein the web content relates to a television program and the method further comprises preventing transmission of video frames of the television program to the first device while the same video frames are being transmitted to the second device and controlling playback of the video frames at the second device as a function of user inputs to the first device, the user inputs being communicated from the first device as part of the second web session, thereby resulting in the second web session remaining active at least while the second portion of the television program is being played back through the second device as part of the third web session.

4. The method of claim 1 further comprising directing the first portion of the web content to the first device in a first format and redirecting the second portion of the web content to the second device in a second format, and receiving the web content from the first site in a third format, the third format being the same as one of but not both of the first format and the second format, the first and second formats corresponding with one of standard definition (SD) and high definition (HD).

5. The method of claim 1 further comprising directing the first portion to the first device at a first bit rate and redirecting the second portion to the second device at a second bit rate, wherein the first and second bit rates are determined as a function of network congestion associated with the second and third web sessions, including determining the network congestion proximate in time to beginning the second web session.

6. The method of claim 5 further comprising:
selecting the first bit rate to be less than the second bit rate when network congestion associated with the second web session is greater than network congestion associated with the third web session;
selecting the first bit rate and the second bit rate to synchronize output of video frames associated with the web content such that the same video frames display simultaneously at the first and second devices; and
wherein the web content is transmitted as part of the first web session at a third bit rate, the third bit rate being different from both of the first bit rate and the second bit rate.

7. A redirect server configured for redirecting content comprising:
a first interface configured to facilitate a first web session with a first website, the first website communicating web content to the redirect server at first address;
a second interface configured to facilitate a second web session with a first device;
a third interface configured to facilitate a third web session with a second device; and
a redirect configured to facilitate:
  i. directing at least a first portion of the web content to the first device as part of the second web session and to facilitate directing at least a second portion of the web content to the second device as part of the third web session without contemporaneously deconstructing the first web session such that at least some of the second portion of the web content redirected to the second device as part of the third web session is received at the first interface after establishing the third web session
  ii. addressing the first portion to a second address assigned to the first device
  iii. addressing the second portion to a third address assigned to the second device; and
  iv. redirecting the second portion to the third address after directing the first portion to the second address and while additional portions of the web content are still being provided from the first site as part of the first web session.

redirecting the second portion to the third address without notifying the first site of the third address; and redirecting the second portion to the second device without the first site creating a fourth web session to transmit the second portion to the second device.

8. The redirect server of claim 7 wherein the redirect server is configured to facilitate addressing the second portion to the second address and the first portion to the third address without the first website changing addressing of the first web session from the first address.

9. The redirect server of claim 7 further comprising a bit rate adapter configured to control a first bit rate at which data is transmitted during the second web session and a second bit rate at which data is transmitted during the third web session, the bit rate adapter assessing network congestion associated with the second and third web sessions and setting the respective first and second bit rates as a function thereof.

10. A method of redirecting content comprising:
receiving the content as part of a first session addressed to a first address;
directing at least a first portion of the received content to a first device as part of a second session;
after directing the first portion to the first device, directing a second portion of the content transmitted within the first session to a second device while the first portion is still being directed to the first device;
directing the second portion to the second device without deconstructing either one of the first session and the second session such that at least a portion the first portion and at least a portion the second portion are simultaneously transmitted to the first and second devices;
addressing the first portion to a second address assigned to the first device
addressing the second portion to a third address assigned to the second device; and
redirecting the second portion to the third address after directing the first portion to the second address and while additional portions of the web content are still being provided from the first site as part of the first web session
redirecting the second portion to the third address without notifying the first site of the third address; and
redirecting the second portion to the second device without the first site creating a fourth web session to transmit the second portion to the second device.

11. The method of claim 10 further comprising authenticating the second device to receive the second portion upon receipt of a token, the token being transmitted from the first device to the second device and subsequently from the second device to a redirect server, the redirect server receiving the content is part of the first session and directing the first portion to the first device and the second portion to the second device.

12. The method of claim 10 further comprising directing the first portion at a first bit rate, directing the second portion at a second bit rate, and receiving the content at a third bit rate, the first, second, and third bit rate each being different.

13. The method of claim 10 wherein the content is a television program comprising a plurality of video frames, wherein the method includes ceasing communication of the plurality of video frames through the second session while maintaining the second session for use in directing playback of the plurality of frames at the second device according to user inputs received at the first device.

14. The method claim 10 further comprising issuing a request from a redirect server to a content provider of the content to create the first session with the redirect server, the redirect server thereafter directing the first portion to the first device and the second portion to the second device while still receiving the content through the first session.

15. The method of claim 14 further comprising transmitting acknowledgment messages or other messages indicating continued activity from the redirect server to the content provider while content is being received as part of the first session and while the first and second portions are respectively being directed to the first and second devices, the acknowledgment messages or other messages indicating continued activity to prevent the content provider from tearing down the first session.

16. The redirect server of claim 7 wherein the redirect is configured to:
    relay acknowledgments received through the second web session to the first website to prevent the first website from tearing down the first web session; and
    mimic the acknowledgments following tearing down of the second web session to prevent the first website from tearing down the first web session while the third web session is still active.

17. The method claim 1 further comprising receiving commands as part of the second web session from the first device, the commands being sufficient to control playback of the second portion at the second device, thereby requiring the second web session to remain active while the second portion is being redirected to the second device.

* * * * *